United States Patent [19]
Casse et al.

[11] 3,820,119
[45] June 25, 1974

[54] TRACKING AND HOMING RADAR WITH DIGITAL REGISTER FOR THE STORAGE OF DISTANCE INFORMATION

[75] Inventors: Robert Casse, Paris; Henri Robin, Louveciennes; Gilbert Vallas, Croissy-sur-Seine, all of France

[73] Assignee: Electronique Marcel Dassault, Paris, France

[22] Filed: Oct. 19, 1972

[21] Appl. No.: 299,016

Related U.S. Application Data
[63] Continuation-in-part of Ser. No. 14,546, Feb. 26, 1970, abandoned.

[30] Foreign Application Priority Data
Feb. 28, 1969  France............................ 69.05472

[52] U.S. Cl............... 343/7.3, 343/5 DP, 343/7 PF
[51] Int. Cl............................................... G01s 9/16
[58] Field of Search.............. 343/5 DP, 7 PF, 7.3

[56] References Cited
UNITED STATES PATENTS

| | | | |
|---|---|---|---|
| 3,040,312 | 6/1962 | Lair | 343/7.3 |
| 3,332,077 | 7/1967 | Nard et al. | 343/7 PF |
| 3,354,455 | 11/1967 | Briggs et al. | 343/7.3 |
| 3,360,795 | 12/1967 | Lundgreen et al. | 343/5 DP |
| 3,408,938 | 11/1968 | Pagazani et al. | 343/7 PF |
| 3,503,068 | 3/1970 | Yamauchi | 343/7.3 |

*Primary Examiner*—Malcolm F. Hubler
*Attorney, Agent, or Firm*—Karl F. Ross; Herbert Dubno

[57] ABSTRACT

A system computing the distance of a reflecting object from the position of an echo pulse within a range gate or telemetering window includes, as the second one of two cascaded integrators, an incrementor for converting the output voltage of the first integrator into a train of counting pulses with a cadence proportional to speed, these counting pulses being fed to a distance register which is periodically discharged into a countdown register to provide a pulse count proportional to distance. The countdown register is progressively read out by clock pulses over a period beginning with the emission of a high-frequency burst by the radar transmitter and ending upon the attainment of a zero count, or possibly a negative count establishing the lower limit of a range gate, as determined by an associated decoder controlling the telemetering-window generator. The output voltage of the decoder may be used to ascertain, with the aid of a comparator receiving a fixed reference voltage, the instant when a craft equipped with the radar system approaches a target to within a critical distance whereupon the first integrator is disconnected from the radar receiver to operate as a speed memory on the basis of data previously stored therein; the decoder output then continues its decrease, by extrapolation, in accordance with the diminishing target distance until another comparator gives rise to a firing pulse detonating a charge aboard the craft.

19 Claims, 8 Drawing Figures

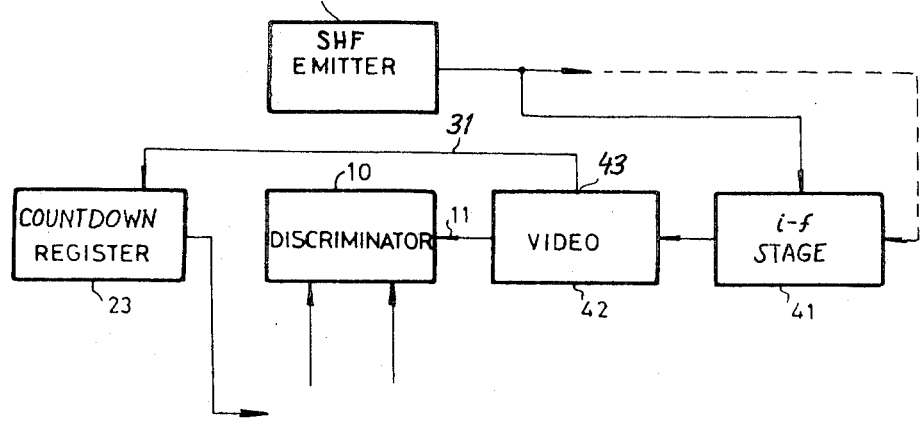
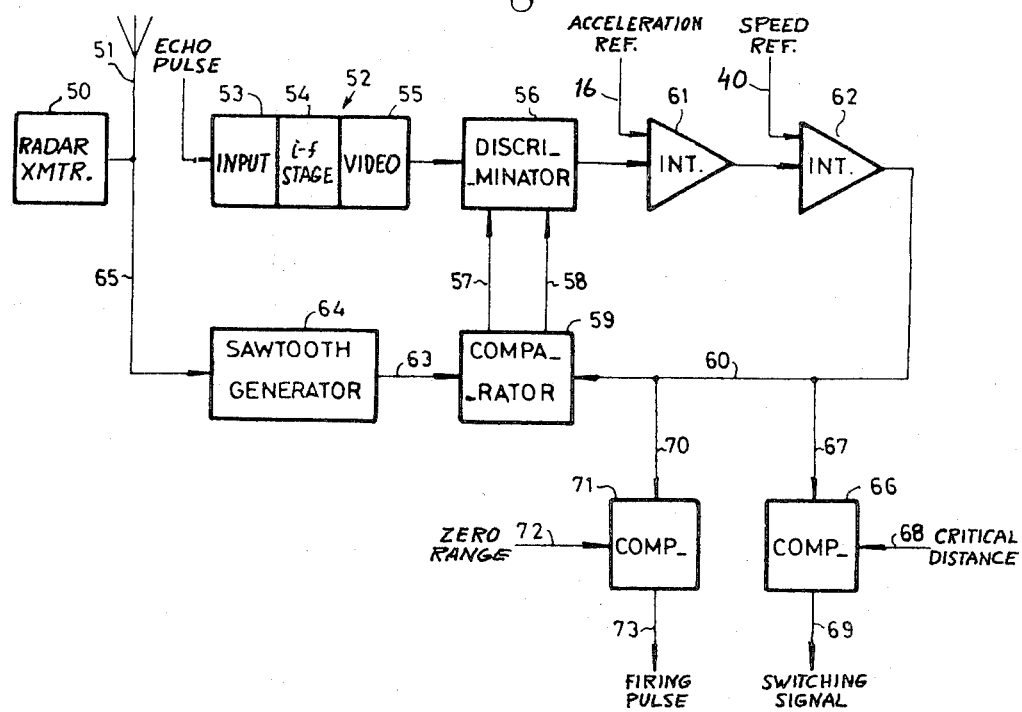

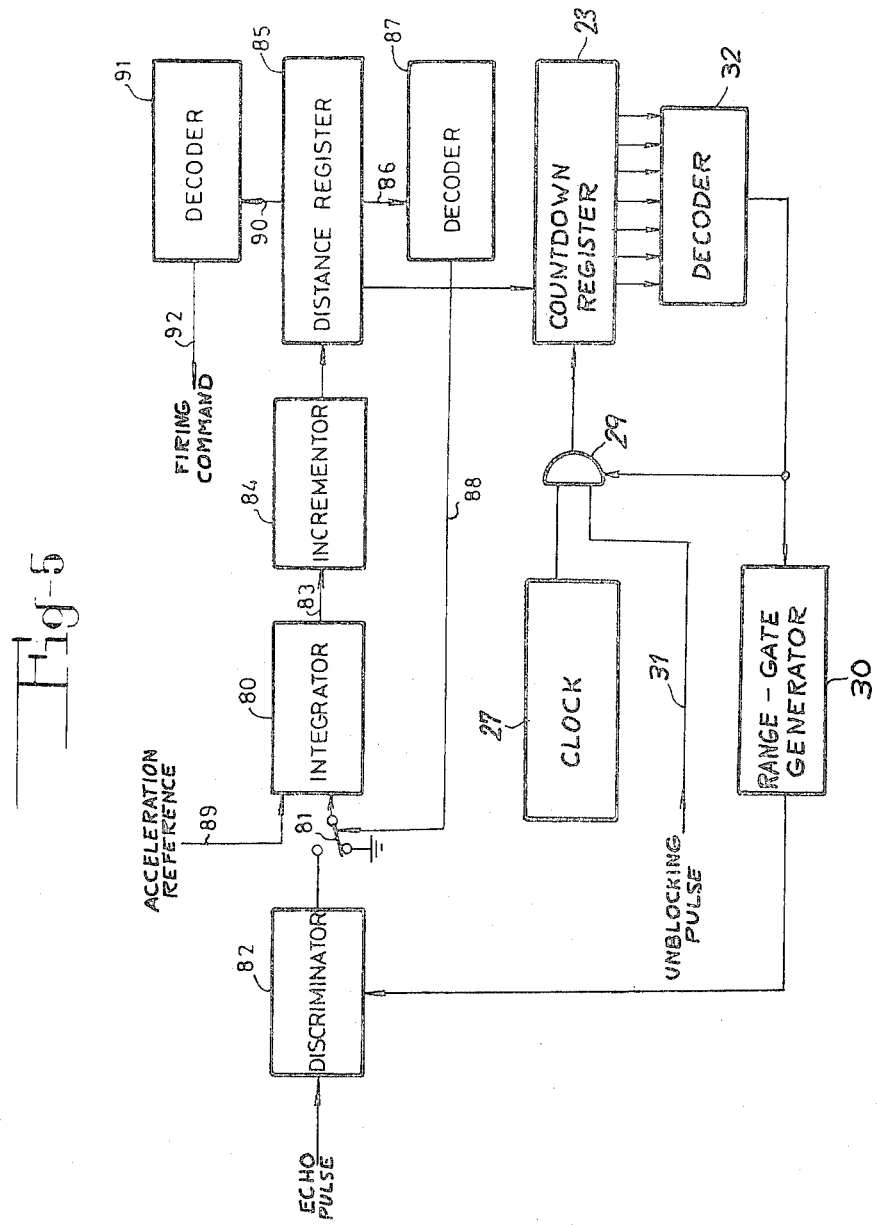

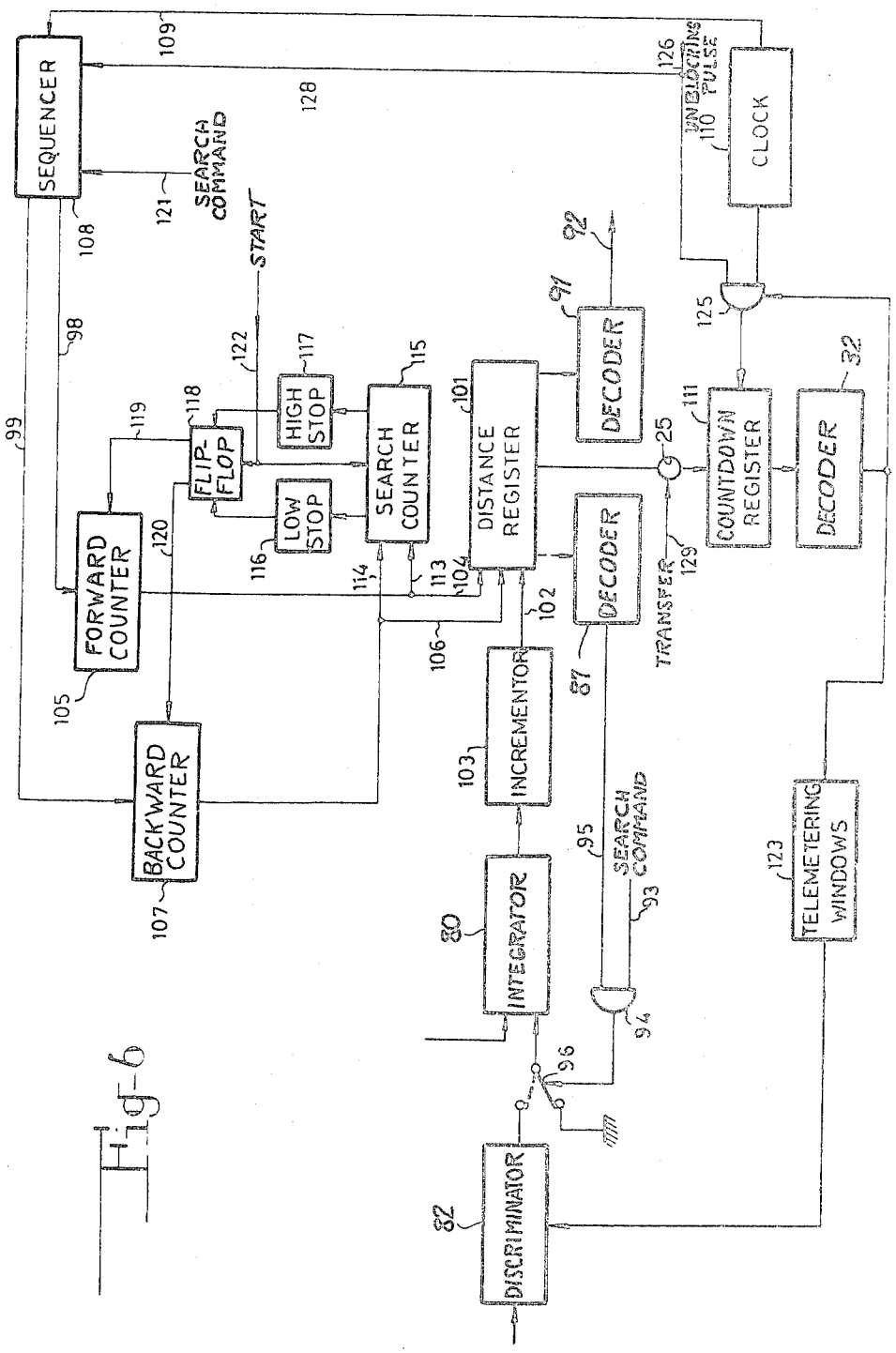

TRACKING AND HOMING RADAR WITH DIGITAL REGISTER FOR THE STORAGE OF DISTANCE INFORMATION

This application is a continuation-in-part of our co-pending application Ser. No. 14,546 filed Feb. 26, 1970 and now abandoned.

Our present invention relates to a telemetering apparatus in a radar system.

In a conventional tracking or homing radar the radar echo is compared in a discriminator with telemetering windows or range gates; the discriminator output proportional to the acceleration of the target with respect to the radar site is applied to a first integrator, providing a voltage representing the speed, this voltage being applied to a second integrator whose output is a voltage representing the distance. The range gates are obtained by comparison of the last-mentioned voltage with a sawtooth voltage triggered by the radar-emission signal.

In such a radar, the precision is not as high as desired, owing on the one hand to the range-computing integrators whose operating conditions vary and on the other hand to the disturbances which affect the sawtooth voltage in the presence of any accidental variation in the supply voltage.

With the aim of enhancing the precision in such a system, the homing radar according to our invention has at least one integration device of the range computer designed as a digital integrator, including an incrementor and a register, instead of the conventional analog integrator.

According to a more particular feature of our invention, the range-gate generator is controlled by a countdown register receiving digital range information from the distance register.

According to another feature of the invention, the distance register receives speed information stored in a memory which permits homing or tracking in case the transmission conditions are such that the radar echo provides an inexact indication, especially in a terminal phase of the approach of a target by a missile equipped with an airborne radar system embodying our present improvement.

The invention also provides means for controlling the firing of a charge aboard such craft with the aid of a homing or tracking radar of this character whose distance information provides the control factor upon reaching a predetermined value. In such a case, the radar used for the tracking may be utilized directly to fire the charge, switching means being provided for passing from the tracking condition to the firing-control condition upon coming within a critical distance from the target.

Our improved system may combine, in a single unit, search radar and homing radar sharing a common distance register which in a first condition is controlled in order to assure the displacement of the telemetering windows or range gates between two predetermined adjustable limits and which in a second condition is part of the integration stage receiving the radar echo.

The invention will be fully understood from the description which follows, given with reference to the accompanying drawing in which:

FIG. 3 is a block diagram of another part of the system in a particular embodiment;

FIG. 4 is a block diagram of part of the system in another embodiment;

FIG. 5 is a block diagram similar to the one shown in FIG. 1;

FIG. 6 is an overall block diagram of a system embodying the invention;

Figure 1:
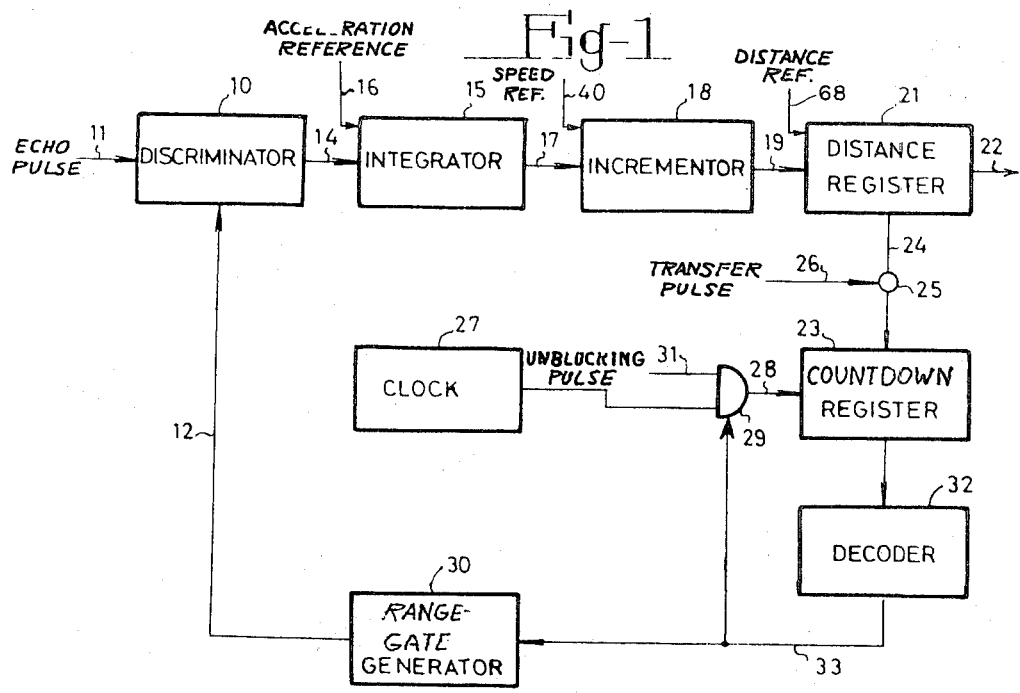
FIG. 1 is a block diagram of a telemetering system according to the invention.

Reference is first made to FIG. 1. A discriminator 10 receives a radar echo from a lead 11 and range-gate information from a lead 12. The signal appearing on an output 14 of the discriminator, which represents the acceleration of the target, is applied to an integrator 15. At the second input 16 of the integrator 15 a voltage which represents an acceleration reference can be fed in. The voltage present on an output 17 of the integrator 15, which represents the relative speed of the target, is applied to a distance-increment generator or incrementor 18 which produces a voltage rising along a straight line whose slope is proportional to the amplitude of the voltage at its input. When this rising voltage reaches a predetermined value, it returns to zero and the incrementor then provides a pulse at its output 19; the output voltage of the incrementor then grows again linearly up to the predetermined limit whereupon a new pulse is emitted on output 19, and so forth, in sawtooth fashion. The cadence or repetition frequency of the pulses on incrementor output 19 is thus representative of the magnitude of the input voltage. The pulses provided by the incrementor are introduced into a counting register or distance memory 21, the combination of the incrementor and the register forming an integration device. The contents of the register 21 represent the distance to the target. The voltage developed on the output 22 of this register can be used for display purposes.

The distance register 21 is associated with a countdown register 23 to which it is connected by a line 24 controlled by means of a gate 25 to which an operating signal is fed by a lead 26. The operating signal comprises a transfer pulse provided by a radar emitter 44 (FIG. 3) at an instant between a pilot pulse generated by the emitter and its super-high-frequency (SHF) tracking pulse; this transfer pulse can be used, for example, to trigger a thyratron in the emitter. Upon the arrival of the transfer pulse, the register 23 is loaded with the contents of the register 21. The readout of the register 23 is effected by stepping pulses provided by an electronic clock 27, preferably quartz controlled, and carried along a lead 28 including an AND gate 29. The gate opens upon the application of an unblocking pulse, derived from the SHF burst of the radar emitter as described below, to a conductor 31.

The shift register 23 works into a decoder 32 providing at its output lead 33 a pulse in response to a zero reading of the register 23. This pulse is used in a device 30 for the conventional generation of the telemetering windows supplied by the lead 12 to the discriminator 10; it is also fed back, as shown, to reading gate 29 for reclosing same.

In the system of FIG. 1, range-gate generator 30 together with leads 33 and 12 constitutes in effect a feedback path transmitting a corrective signal from counting-pulse storer 23 to discriminator 10 which provides the acceleration signals for the computer 15, 18, 21.

Figure 2:
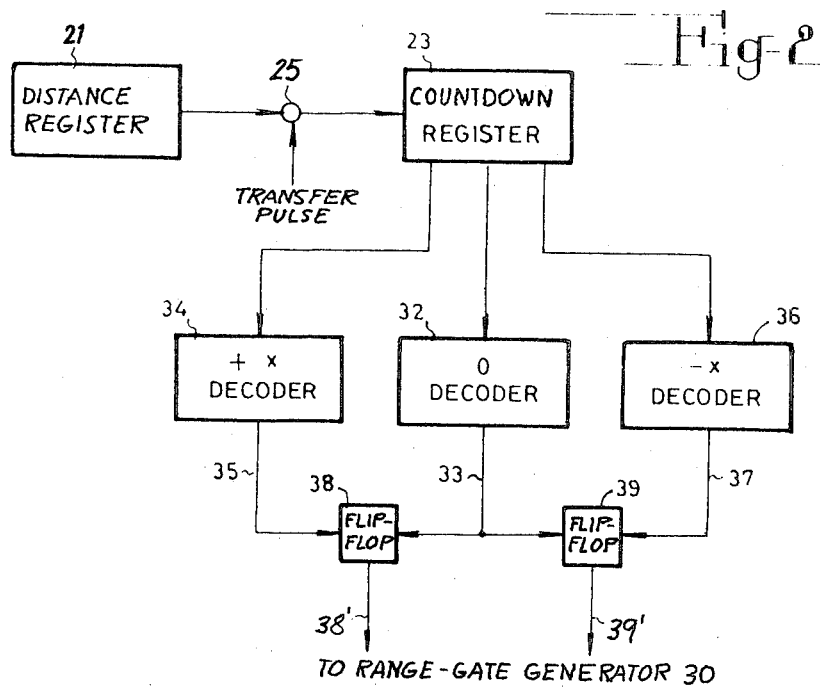
FIG. 2 is a block diagram of a part of the system shown in FIG. 1.

FIG. 2 shows means for directly obtaining two telemetering windows. Here the countdown register 23 feeds not only a decoder 32, providing a pulse for indicating the zero reading of the register 23, but also a second decoder 34, providing a pulse at its output lead 35 when the contents of the register 23 equal the width of a telemetering window, for example +$x$, and a third decoder 36, providing a pulse when the contents of the countdown register are −$x$. A bistable circuit or flip-flop 38 is set upon arrival of a pulse on conductor 35 from the output of decoder 34 and is reset upon arrival of a pulse on conductor 33 from the output of the zero decoder 32. A second bistable circuit or flip-flop 39 is set upon arrival of a pulse via conductor 33 and is reset upon receiving a pulse via a conductor 37 from the output of the decoder 36. The outputs 38' and 39' of the flip-flops 38 and 39 are a pair of adjoining telemetering windows which are supplied to the discriminator 10 of FIG. 1 as part of a range gate with upper and lower limits ±$x$.

Initially, a distance reference can be introduced into the register 21 via an output 68 (FIG. 1).

A speed reference can be introduced by an input 40 into the incrementor.

The frequency of the clock 27 and the increments provided by the distance incrementor are so chosen with reference to each other that the contents of the distance register are of suitable magnitude. For example, the clock may have a frequency of 200 MHz and the value of the distance or range increments may be 0.75m.

According to another feature of the invention, the unblocking pulse applied by the lead 31 to the gate 29 is generated by emitter 44 by feeding its SHF burst to the gate 29 not directly but by way of the intermediate-frequency (i–f) stage 41 (FIG. 3) of the receiver and a video stage 42, the lead 31 being connected to an output 43 of the video stage. This eliminates the effect of any variations in the transmitting conditions of these stages, their influence on the echo being the same as that on the pulse controlling the stepping of the counter.

A radar according to the invention, which can be classified as digital, is of simpler construction than a conventional homing radar but is of substantially increased accuracy. Such a radar avoids the difficulties of conventional radar systems wherein a sawtooth generator co-operates with an analog integrator for determining distance.

Reference is now made to FIG. 4. A radar transmitter 50 sends an SHF tracking signal into space by an antenna 51. The radar echo reaches a receiver 52 via an input stage 53 whereupon it is processed by an i–f stage 54 and a video stage 55, whose output is applied to a position discriminator 56 which also receives the telemetering windows via leads 57 and 58 from a comparator 59. The comparator 59 receives on a lead 60 a voltage which is a function of distance resulting from successive integrations in two cascaded integrators 61 and 62 receiving acceleration and speed references via ancillary inputs 16 and 40 (cf.FIG. 1). A second input 63 of comparator 59 is energized by a voltage from a sawtooth generator 64 which is triggered by the SHF emission via a lead 65.

According to this aspect of our invention, a further comparator 66 receives on an input 67 the voltage representing distance and on another input 68 a fixed reference voltage so as to energize its output 69 when the distance generated by the cascaded integrator devices assumes, during tracking, a predetermined value corresponding to a critical distance. This pulse is used to place the apparatus in an alternate operating condition, i.e., the memory condition, in which an indication of distance is derived by integrator 62 from stored speed values such as those provided by integrator 61 during the time period immediately preceding the switchover. In the latter phase, therefore, an airborne system aboard a craft carrying an explosive charge extrapolates from the previous measurements the diminishing distance between the craft and its target.

The voltage on lead 60 assumes values which correspond to a progressive diminution of the target distance and are applied by an input 70 to a comparator 71 receiving on its other input 72 a voltage which corresponds to a predetermined value of that distance, e.g., zero. When the comparison shows that the voltage on the input 70 is equal to the voltage on the input 72, a pulse is delivered at the output 73 of the comparator and can be used to fire an explosive charge. Such a device operates as a proximity fuze. It obviates the difficulties due to the parasitic echoes, or to the "image" of the missile during a low-altitude flight, especially above the sea.

Reference is now made to FIG. 5. An integrator 80 can be connected by a switch 81 to the discriminator 82, to register the instantaneous speed measured by the radar system, or else may operate as a memory to store the data fed in. In the first condition, integrator 80 provides at its output 83 a voltage representing the speed of the radar-equipped missile with respect to a target, by means of a distance-increment generator or incrementor 84, followed by a distance register 85. An output 86 of the register is connected to a decoder 87 which generates in its output 88 a switching command when the decreasing distance read out from the register 85 becomes equal to a predetermined value, as described above with reference to comparator 66.

After this switching, the apparatus function in open-loop condition, starting with the value of speed stored at the moment of switching in the memory 80 as supplemented by an ancillary accelerometric input 89. The register 85, continuing to compute the target distance from the stored speed value, is connected by a channel 90 to a second decoder 91 which provides at its output 92 a firing command when the distance information contained in the register 85 reaches the determined value, e.g., zero, as described above with reference to comparator 71.

The integrator 80 can also be used as a speed memory while the system operates as a homing or tracking radar, for example, in the case of temporary disappearance of the echo or when it has been jammed. It can be controlled by a device sensitive to jamming in order to obviate any undesirable effect.

A systematic switchover to the mode of operation involving the storage of speed information may be carried out in accordance with specific requirements.

The embodiment of FIG. 6 includes a distance register 101 acted upon not only by the output 102 of a distance-increment generator 103 but also, via a lead 104, by pulses issuing from a forward counter 105 and via a channel 106 by pulses issuing from a backward counter 107.

The devices 105 and 107 respectively count up and down the pulses provided by a sequencer 108. This sequencer receives at an input 109 a train of equispaced timing pulses supplied, for example, by a clock 110 which produces counting pulses for a countdown register 111 disposed in the distance-tracking circuit. The sequencer 108 generates pulses which can be of a frequency different from that of the pulses emitted by the clock 110. The frequencies at two outputs 98 and 99 of the sequencer can differ from one another.

The forward-counting and backward-counting pulses originating from devices 105 and 107 are further applied to respective inputs 113 and 114 of a searching counter 115 which triggers by means of a low stop 116 and high stop 117, under the control of outputs 119 and 120 of a flip-flop 118, the counting devices 105 and 107 when the distances introduced into the register 101 by the inputs 104 and 106 reach predetermined values. The order to search is transmitted to the sequencer 108 by an input 121.

An input 122, energizable by an initiating signal, permits the introduction into the distance register 101, by means of the counter 115, of a predetermined range reference from which the search is started.

When the system is placed in the searching condition by the command transmitted via lead 121, the register 101 causes, by means of the countdown register 111, the displacement of the telemetering windows generated in the device 123 starting from the distance corresponding to the initiating signal applied via lead 122 to flip-flop 118 in order to set same. The shifting of the windows is controlled by stepping pulses which are transmitted to register 101 in one phase by the forward counter 105, and to which corresponds a predetermined direction of displacement of the telemetering windows, until the flip-flop 118 is reset by a signal from one of the two stop circuits, e.g., the high stop 117, and in another phase by the backward counter 107 until the intervention of the other stop, here the low stop 116, and the flip-flop 118 which inhibits the counting unit 107 and again enables the counting unit 105, and so on. In case the pulse trains generated by the counters 105 and 107 have different cadences, the displacement of the telemetering windows occurs at mutually different speeds in the two directions.

At the outset of the search, the flip-flop 118 inhibits the backward counter 107 and by input 119 enables the forward counter 105. Counter 105 receives via its input 98 a series of $N_c$ forward-counting pulses and directs this series simultaneously to the input 113 of the searching counter 115 and to the input 104 of the register 101.

During each recurrence period or cycle defined by the radar synchro applied to another input 128, of sequencer 108 the contents of the searching counter 115 and the distance register 101 increase by $N_c$ distance increments. As soon as the contents of the searching counter 115 reach a value equal to the sum of half its capacity plus a value B representing the extent of the search sweep in the direction of increasing distances, the high-stop device 117 energizes the corresponding input of flip-flop 118 to set same, thus inhibiting the counting unit 105 and enabling the other counter 107.

The latter receives on its input 99 a series of $N_d$ backward-counting pulses and simultaneously directs these pulses to the input 114 of the searching counter 115 and to the input 106 of the distance register 101. The contents of the searching counter and of the distance register decrease by $N_d$ distance increments during each cycle. When the contents of the searching counter 115 reach a value equal to the difference between half its capacity and a quantity B' representing the extent of the range sweep in the direction of decreasing distances, the low stop 116 energizes the corresponding input of flip-flop 118 to reset same, thereby returning the search controller to its forward-counting condition.

The end of the search command leaves the distance register 101 with the contents that it had at the moment of termination of that command.

If the search command reappears without the application of an initiating signal to lead 122, the distance search proceeds without changing the central distance of the sweep.

During the distance search, the register 101 also receives range increments generated by integrator 103 operating as a speed memory.

Initially, each time that the telemetering windows are synchronized with the radar echo, the radar generates a signal which by the input 122 places the flip-flop 118 in a predetermined state and centers the searching counter 115 so that the contents thereof are equal to half its maximum capacity.

In order to avoid disturbances which could arise from the initiation of the generation of range increments from the unit 103 when the system is in its search condition, the unblocking pulse synchronized with the SHF burst and carried by a conductor 126 is applied not only to an AND gate 125 controlling the register 111, but also to the input lead 128 for the sequencer 108.

The transfer from the distance register 101 into the countdown register 111 is commanded by a pulse applied through a lead 129 to open the gate 25 (cf. FIG. 2). It is thus made certain that, at the moment of the transfer from the distance register 101 into the register 111, the distance information contained in the register 101 does not vary.

The search command given via lead 121 to the sequencer 108 is also applied via a lead 93 to a gate 94 which also receives, by way of a lead 95, the switching order causing the system to pass from its condition of operating as a homing radar to that of executing the firing command. The switching is effected by a device 96.

Figure 7:
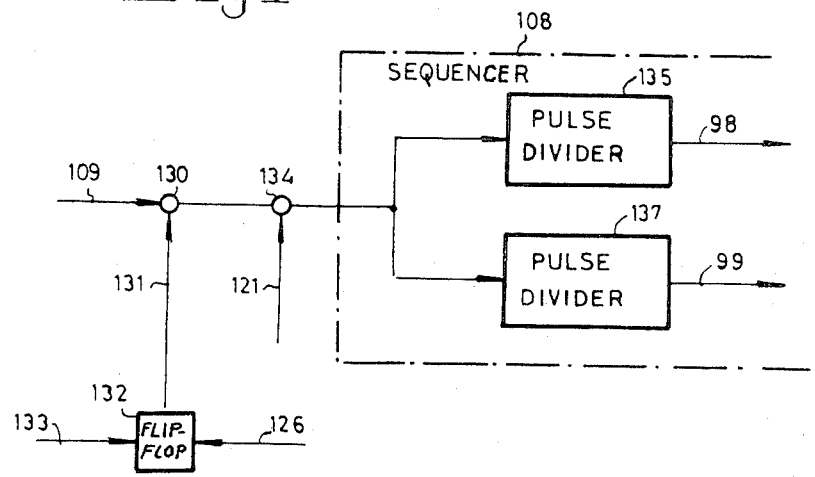
FIG. 7 is a block diagram of part of the system of FIG. 6.

FIG. 7 shows the make-up of the sequencer 108. A first gate 130 in lead 109 is controlled by a lead 131 from an inhibiting flip-flop 132 which assures the closing of the gate 130 upon the arrival of a pulse via a lead 133 prior to the reception of the transfer pulse over lead 109. The opening of the gate 130 is controlled by the flip-flop 132 upon the arrival via lead 126 of the unblocking pulse synchronized with the SHF burst. A gate 134 provided at the input of the sequencer 108 is opened by the search command appearing in the input 121. The sequencer 108 comprises a first pulse divider 135 for generating a series of forward-counting pulses on lead 98 and a second pulse divider 137 for generating a series of backward-counting pulses on lead 99.

Figure 8:
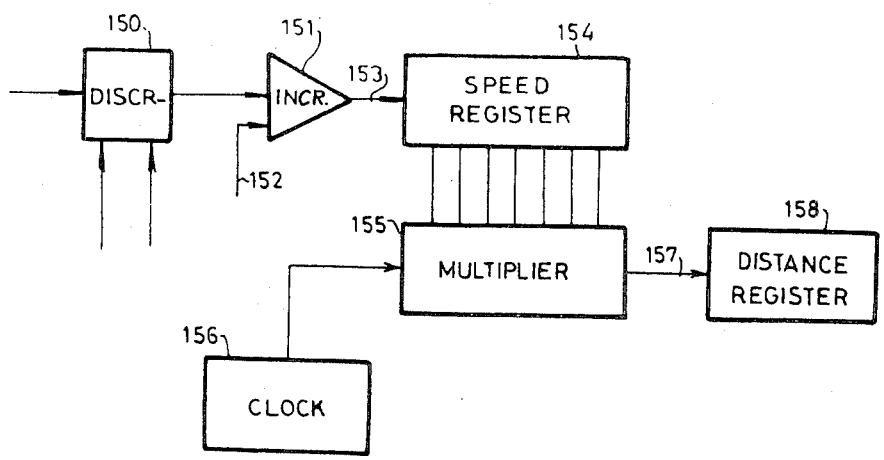
FIG. 8 is a block diagram of another part of that system.

The first integration stage (15, FIG. 1) may also comprise an incrementor followed by a register. The discriminator 150 (FIG. 8) is then followed by an incrementor 151 which further comprises an accelerometric input 152. The output 153 of the unit 151 applies the speed increments to a speed register 154 which can be of the memory type and which presets a multiplier 155 receiving pulses from an associated clock 156. The multiplier 155 delivers, on its output 157, range increments which are applied to a distance register 158.

The incrementor 151 may include means for reducing the bandwidth in order that the servo control be stable and respond to the desired characteristics.

We claim:

1. A tracking radar system comprising a telemetering-window generator, a discriminator receiving on a first input signals representative of the generated windows and on a second input a radar echo, an integrator following said discriminator and connected thereto, a counting register, and increment-generating means between said integrator and said register for delivering pulses to said register in correspondence with the increments generated.

2. A system as defined in claim 1 wherein the increments generated are range increments.

3. A system as defined in claim 1, further comprising a pulse-generating clock, said integrator comprising an incrementor followed by a speed-increment register connected to said counting register by a multiplier receiving on a first input the output of the speed-increment register and on a second input the pulses delivered by said clock.

4. A system as defined in claim 1 wherein said register is a distance register, further comprising pulse-counting means between said register and said telemetering-window generator for controlling said generator.

5. A system as defined in claim 4 wherein said pulse-counting means comprise a countdown register connected to said distance register and a decoder connected between said countdown register and said telemetering-window generator.

6. A system as defined in claim 5, further comprising a gate between said registers periodically triggered by a transfer pulse.

7. A system according to claim 5, further comprising gate means in a reading input of said countdown register and a source of stepping pulses applied through said gate means to said reading input, said gate means being openable by periodic unblocking pulses and closable in response to an output signal delivered by said decoder to said generator.

8. A system according to claim 7, including a radar receiver with an intermediate-frequency stage followed by a video stage, said unblocking pulses being derived from an emitted high-frequency burst by way of said intermediate-frequency and video stages.

9. A system according to claim 5 wherein said decoder has a first output for establishing an upper range-gate limit for said generator in response to a predetermined positive count of said countdown register and a second output for establishing a lower range-gate limit for said generator in response to a predetermined negative count of said countdown register.

10. An airborne homing system for a craft carrying an explosive charge, comprising:

radar means for determining variations in the distance between the craft and a target;

computer means including a memory initially connected to said radar means for establishing a progressively diminishing distance indication upon the craft approaching said target;

a first comparator in the output of said computer means for generating a switching signal upon said distance indication assuming a first predetermined value;

switchover means responsive to said switching signal for disconnecting said computer means from said radar means while preserving data stored in said memory to provide said distance indication independently of said radar means; and a second comparator in the output of said computer means for generating a firing pulse for the detonation of said charge upon said distance indication assuming a second predetermined value.

11. A system as defined in claim 10 wherein said memory comprises a first integrator receiving acceleration signals from said radar means, said computer means further comprising a second integrator connected to the output of said first integrator.

12. A system as defined in claim 11 wherein said radar means includes an emitter of high-frequency bursts, a discriminator receiving echo signals to generate said acceleration signals, a sawtooth-voltage generator triggerable by said bursts and comparison means connected to match an output voltage from said second integrator with the sawtooth voltage of said generator for delivering telemetering information to said discriminator.

13. A system as defined in claim 11 wherein said second integrator comprises an incrementor converting an output voltage from said first integrator into a train of counting pulses of a cadence proportional to relative target speed, a distance register receiving said counting pulses, storage means for said counting pulses, and transfer means for periodically discharging said distance register into said storage means.

14. A system as defined in claim 13 wherein said radar means further includes a receiver of echo pulses, a range-gate generator controlled by said storage means, and a discriminator connected to receive the outputs of said receiver and said range-gate generator for deriving said acceleration signals therefrom.

15. A system as defined in claim 14 wherein said storage means comprises a countdown register and a source of stepping pulses therefor actuatable upon the emission of each high-frequency burst to progressively reduce the contents of said countdown register to a predetermined minimum.

16. A tracking radar system comprising:

transmitting means for periodically sending out high-frequency bursts;

receiving means for intercepting echoes of said bursts;

computer means responsive to variations in the spacing of said bursts and said echoes for deriving therefrom a voltage proportional to the speed of a reflecting object relative to said transmitting and receiving means;

an incrementor connected to said computer means for converting said voltage into a train of counting pulses of a cadence proportional thereto;

a distance register connected to said incrementor for receiving said counting pulses therefrom;

storage means for said counting pulses;

transfer means for periodically discharging said distance register into said storage means in timed relationship with the emission of said bursts; and feedback means extending from said storage means to said computer means for modifying the operation thereof.

17. A system as defined in claim 16 wherein said storage means comprises a countdown register and a source of stepping pulses therefor actuatable upon the emission of each high-frequency burst to progressively reduce the contents of said countdown register to a predetermined value, said feedback means transmitting to said computer means a corrective signal upon attainment of said value.

18. A system as defined in claim 17 wherein said feedback means includes a range-gate generator and a decoder in the output of said countdown register controlling said range-gate generator.

19. A system as defined in claim 18 wherein said decoder is provided with a first output for establishing an upper range-gate limit for said generator in response to a predetermined positive count of said countdown register, a second output for establishing a lower range-gate limit for said generator in response to a predetermined negative count of said countdown register, a third output responsive to a zero count of said countdown register, and bistable means controlled by said first, second and third outputs for establishing two adjoining telemetering windows in said generator.

* * * * *